United States Patent
Bhooma et al.

(10) Patent No.: US 11,006,315 B2
(45) Date of Patent: *May 11, 2021

(54) COMMUNICATION ADAPTATION BASED ON LINK-PERFORMANCE

(71) Applicant: Apple Inc., Cupertino, CA (US)

(72) Inventors: Padmavathy Bhooma, Los Gatos, CA (US); Vincent Lubet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,662

(22) Filed: Jul. 22, 2019

(65) Prior Publication Data

US 2019/0342787 A1    Nov. 7, 2019

Related U.S. Application Data

(63) Continuation of application No. 15/172,842, filed on Jun. 3, 2016, now Pat. No. 10,362,508.

(60) Provisional application No. 62/171,483, filed on Jun. 5, 2015.

(51) Int. Cl.
*H04W 28/02* (2009.01)
*H04W 24/08* (2009.01)

(52) U.S. Cl.
CPC ....... *H04W 28/0273* (2013.01); *H04W 24/08* (2013.01)

(58) Field of Classification Search
CPC .................. H04W 24/0273; H04W 24/08
See application file for complete search history.

(56) References Cited

U.S. PATENT DOCUMENTS

| | | | |
|---|---|---|---|
| 6,697,378 B1 | 2/2004 | Patel | |
| 6,757,245 B1 | 6/2004 | Kuusinen et al. | |
| 9,311,066 B1 | 4/2016 | Garman et al. | |
| 10,362,508 B2 * | 7/2019 | Bhooma | H04W 28/02 |
| 2005/0063348 A1 | 3/2005 | Donovan | |
| 2006/0023634 A1 | 2/2006 | Morandin | |
| 2007/0292135 A1 | 12/2007 | Yong et al. | |
| 2009/0258596 A1 | 10/2009 | Naik | |
| 2012/0182907 A1 | 7/2012 | Li et al. | |
| 2013/0235843 A1 * | 9/2013 | Gohari | H04W 80/06 |
| 2014/0195453 A1 | 7/2014 | Richie et al. | |
| 2014/0355565 A1 | 12/2014 | Hayes et al. | |
| 2014/0362765 A1 | 12/2014 | Biswas et al. | |
| 2015/0295682 A1 | 10/2015 | Megard et al. | |
| 2015/0334153 A1 | 11/2015 | Koster et al. | |
| 2015/0350246 A1 | 12/2015 | Bergman | |

* cited by examiner

*Primary Examiner* — Ronald B Abelson
(74) *Attorney, Agent, or Firm* — Sterne, Kessler, Goldstein & Fox P.L.L.C.

(57) ABSTRACT

Adapting communication of information based on link-performance characteristics is discussed herein. For the example, an apparatus can include an interface circuit and a processor. The interface circuit communicates with an electronic device via a link. And the processor is communicatively coupled to the interface circuit. The interface circuit provides one or more performance metrics characterizing the link to the processor. And the processor adapts a communication with the electronic device via the link based on the one or more performance metrics.

20 Claims, 6 Drawing Sheets

COMMUNICATION ADAPTATION BASED ON LINK-PERFORMANCE

CROSS-REFERENCE TO RELATED APPLICATION

This application is a continuation of U.S. Nonprovisional patent application Ser. No. 15/172,842, titled "Communication Adaptation Based on Link-Performance Characteristics," which was filed on Jun. 3, 2016, which claims the benefit of U.S. Provisional Patent Application No. 62/171,483, titled "Application Adaptation Based on Link-Performance Characteristics," which was filed on Jun. 5, 2015, both of which are incorporated herein by reference in their entireties.

BACKGROUND

Field

The described embodiments relate to techniques for improving communication performance in a wireless network, including adapting the communication of information by applications based on link performance characteristics.

Related Art

Electronic devices can include a networking subsystem used to wirelessly communicate with other electronic devices. For example, these electronic devices can include a networking subsystem with a cellular network interface (e.g., an interface associated with a Universal Mobile Telecommunications System (UMTS) or with the Long-Term Evolution (LTE) standard), a wireless local area network interface (e.g., a wireless network based on the Institute of Electrical and Electronics Engineers (IEEE) 802.11 standard, which is sometimes referred to as "Wi-Fi," or based on Bluetooth from the Bluetooth Special Interest Group of Kirkland, Wash.), and/or another type of wireless interface.

Problems can occur during wireless communications due to, for example, changes in communication links or in a surrounding environment. For example, a wireless network may temporarily be unavailable due to interference or a power-saving idle time. These problems can degrade the performance of applications that execute on the electronic devices. It turn, these problems can degrade a user's experience with the electronic devices.

SUMMARY

Some embodiments relate to an electronic device that includes the following: (i) an interface circuit that communicates with an electronic device using a link; (ii) a memory that stores a program module; and (iii) a processor that executes the program module. The interface circuit provides one or more performance metrics characterizing the link to the program module. The program module adapts a communication with the electronic device via the link based at least in part on the one or more performance states.

Some embodiments also relate to a computer program product for use in conjunction with an electronic device, in which the computer program product includes a non-transitory computer-readable storage medium and a computer program mechanism embedded therein to adapt communication of information. The computer program mechanism includes the following: (i) instructions for communicating the information to another electronic device via a link; (ii) instructions for receiving, from an interface circuit in the electronic device, one or more performance metrics characterizing the link; and (iii) instructions for adapting the communication of the information based at least in part on the one or more performance metrics.

Some embodiments also relate to a method for adapting communication of information. The method includes the following: (i) communicating the information with an electronic device via a link; (ii) receiving, from an interface circuit, one or more performance metrics characterizing the link; and (iii) adapting a Transmission Control Protocol (TCP) send window size based at least in part on the one or more performance metrics.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS/FIGURES

The accompanying drawings, which are incorporated herein and form a part of the specification, illustrate embodiments and, together with the description, further serve to explain the embodiments and to enable a person skilled in the relevant art to make and use the disclosed embodiments.

Figure 1:
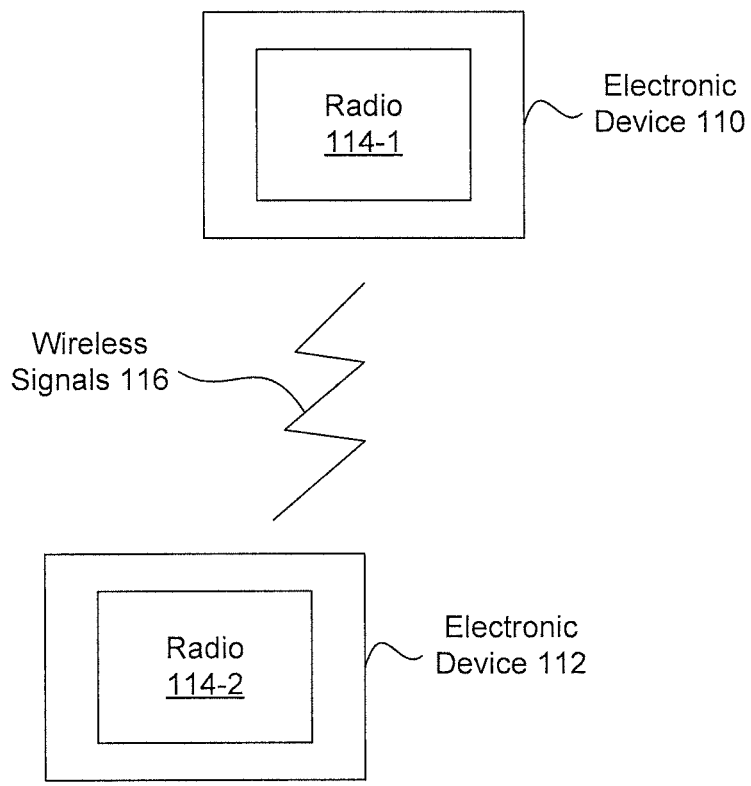
FIG. 1 illustrates example electronic devices wirelessly communicating with one another, according to some embodiments.

Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

To improve the performance of a program module executing on an electronic device, the program module (or an operating system of the electronic device) can perform link-aware communication adaptation. In some embodiments, an interface circuit associated with the electronic device can provide one or more performance metrics characterizing a link (or the link quality) to the program module. The performance metrics can include, for example, any or all of latency, throughput, jitter, packet loss, bandwidth, and availability. Based on the performance metrics, the program module can adapt the communication of information with another electronic device via the link. Adaptation of the communication of information can include, for example, (i) configuring a queue (e.g., an interface output or send queue), (ii) avoiding a retransmission of a packet when the link is unavailable, (iii) avoiding the retransmission of the packet based on a latency of the link, and/or (iv) setting a Transmission Control Protocol (TCP) send window size based on a maximum bandwidth of the link.

The adaptation of the communication of information provides performance improvements in the program module (and thus the electronic device). For example, a link-aware adaptation allows the program module to coordinate its actions with dynamic variations in the performance of the link. In the absence of the one or more performance metrics, the program module can incorrectly conclude that the link is unstable and thus adversely impact performance. The example communication techniques disclosed herein address, among other things, this issue and thus improve a user's experience with the electronic device.

The information communicated between electronic devices in some embodiments can be conveyed in packets, frames, or other data formats. In some embodiments, these other data formats can be compliant with a transmission and reception by radios in electronic devices based on a communication protocol (e.g., Wi-Fi or Bluetooth), a cellular-telephone communication protocol (e.g., a third/fourth generation of mobile telecommunications technology (3G/4G) or LTE), and/or another type of wireless interface. In some embodiments, the packets or frames can be communicated using a wired communication protocol (e.g., the IEEE 802.3 standard, which is sometimes referred to as "Ethernet").

FIG. 1 illustrates example electronic devices 110 and 112 wirelessly communicating with one another, according to some embodiments. In some embodiments, these electronic devices can wirelessly communicate while (i) detecting one another by scanning wireless channels, (ii) transmitting and receiving beacons or beacon frames on wireless channels, (iii) establishing connections (e.g., by transmitting connect requests), and/or (iv) transmitting and receiving packets, frames, or other data formats (which may include payload information).

Electronic devices 110 and 112 can each include subsystems such as, for example, a networking subsystem, a memory subsystem, and a processor subsystem. These subsystems are described in detail with respect to FIG. 5 below. Each of electronic devices 110 and 112 can also include a radio 114 in their respective networking subsystems. Generally, each of electronic devices 110 and 112 can include (or can be included within) any electronic device with a networking subsystem to enable each of electronic devices 110 and 112 to wirelessly communicate with each other and/or another electronic device. This wireless communication can include, for example, (i) transmitting beacons on wireless channels to enable the electronic devices to make initial contact with or otherwise detect each other, (ii) exchanging one or more subsequent data/management frames (e.g., connect requests) to establish a connection or link, (iii) configuring one or more security options (e.g., Internet Protocol Security (IPSec)), and/or (iv) transmitting and receiving packets or frames via the link.

In referring to FIG. 1, wireless signals 116 (represented by a jagged line) are transmitted by a radio 114-1 in electronic device 110 (which may be included in an interface circuit). Wireless signals 116 are received by a radio 114-2 in electronic device 112 (which may also be included in an interface circuit). In particular, electronic device 110 can transmit packets with information to electronic device 112. Alternatively or additionally, electronic device 112 can transmit packets with information to electronic device 110.

The performance of wireless communication (e.g., latency, throughput, jitter, packet loss, bandwidth, and availability) can vary with time. For example, wireless networks can have periodic failures, changes in device/equipment characteristics and/or changes in link characteristics such as when an interface circuit in electronic device 110 transitions to a sleep or power-saving mode. When an application executing on electronic device 112 is unaware of the reason for the change in performance, the application can incorrectly conclude that the wireless network is unstable. For example, due to the change in performance, the application executing on electronic device 112 may not receive an acknowledgement in response to a packet transmitted via electronic circuit 110's interface circuit. And, consequently, the application can request the interface circuit to unnecessarily retransmit the packet.

To prevent this unnecessary packet retransmission in this as well as other examples, the interface circuit in electronic device 110 can provide one or more performance metrics characterizing a link between electronic devices 110 and 112 to a program module executed by a processor in electronic device 110, according to some embodiments. In some embodiments, the one or more performance metrics can include a latency of the link, a throughput of the link, a jitter of the link, a packet loss associated with the link, a bandwidth of the link, and/or an indication of when the link is unavailable. In some embodiments, the program module can include an operating system of the electronic device.

Based on the one or more performance metrics, the program module can communicate information to electronic device 112 via the link to allow an adaptation to the communication. For example, the one or more performance metrics can be provided by a driver executed by the interface circuit. This driver can be in a data-link layer in an Open Systems Interconnection (OSI) model, according to some embodiments. The program module can be in a layer above the data-link layer.

In some embodiments, adapting the communication of the information can include (i) configuring a queue (e.g., an interface output or send queue), (ii) avoiding retransmission of a packet when the link is unavailable, (iii) avoiding retransmission of the packet based on a latency of the link, and/or (iv) setting a TCP send window size based on a maximum bandwidth of the link. Additionally, in some embodiments, adapting the communication of the information can be based on one or more historical performance metrics characterizing the link that are aggregated and stored in memory. The memory can be local or remote (e.g., in a network-accessible server) to electronic device 110.

In some embodiments, processing a packet or frame in either of electronic devices 110 and 112 can include (i) receiving wireless signals 116 with the packet or frame, (ii) decoding/extracting the packet or frame from received wireless signals 116 to acquire the packet or frame, and/or (iii) processing the packet or frame to determine information contained in the packet or frame (e.g., information in the payload).

Though the network environment shown in FIG. 1 is described above, as would be understood by a person of ordinary skill in the art, different numbers or types of electronic devices can be used. For example, some embodiments can include more or fewer electronic devices. And, in some embodiments, different electronic devices can be used to transmit and/or receive packets or frames.

Figure 2:
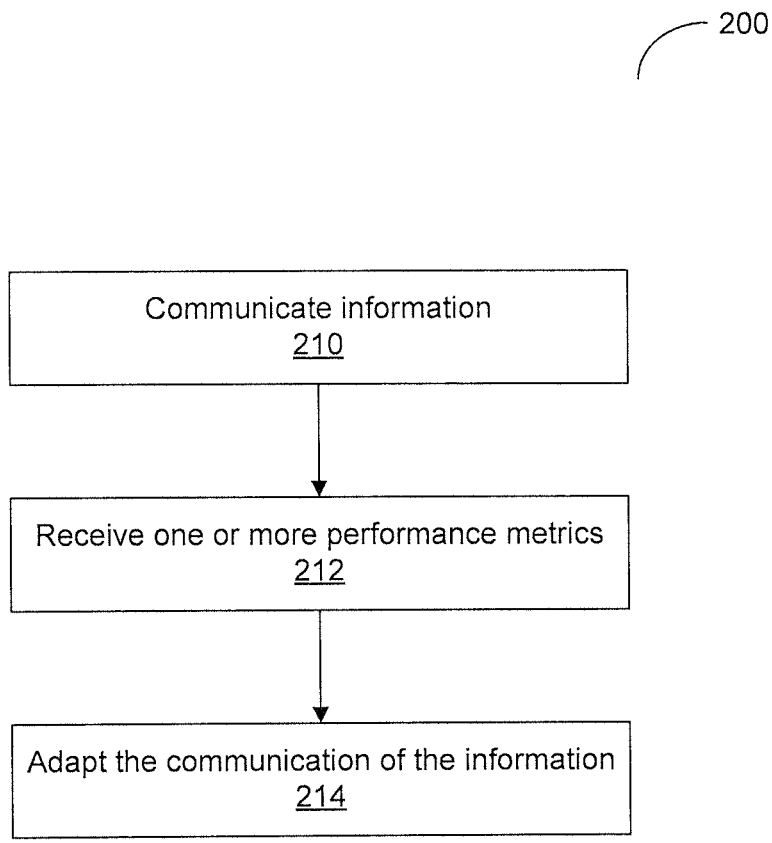
FIG. 2 illustrates an example method for adapting communication of information by an electronic device, according to some embodiments.

FIG. 2 illustrates an example method 200 for adapting communication of information by an electronic device, according to some embodiments. Method 200 can be performed by an electronic device such as, for example, electronic device 110 or electronic device 112 of FIG. 1.

In 210, the electronic device communicates information with another electronic device via a link. For example, electronic device 110 can communicate information 116 with electronic device 112.

In 212, the electronic device receives—via an interface circuit associated with the electronic device—one or more performance metrics characterizing the link. For example, either electronic device 110 or 112 can communicate information 116 with the other electronic device 112 or 110. Such information 116 can include one or more performance metrics characterizing the link over which electronic devices 110 and 112 communicate.

In 214, the electronic device adapts the communication of the information based on the one or more performance metrics. In some embodiments, the adaptations to the communication of the information can include (i) configuring a queue (e.g., an interface output or send queue), (ii) avoiding retransmission of a packet when the link is unavailable, (iii) avoiding retransmission of the packet based on a latency of the link, and/or (iv) setting a TCP send window size based on a maximum bandwidth of the link. For example, either electronic device 110 or 112 can adapt the communication of information 116 based on the received performance metrics. As would be understood by a person of ordinary skill in the art, a goal of the disclosed embodiments is to improve the use of (or even optimally use) the capacity of the link to, for example, avoid congestion and align communication of the information with the link's timing availability.

In some embodiments, method 200 can have additional or fewer operations. Moreover, the order of the operations in method 200 can be changed, and/or two or more operations may be combined into a single operation.

Figure 3:
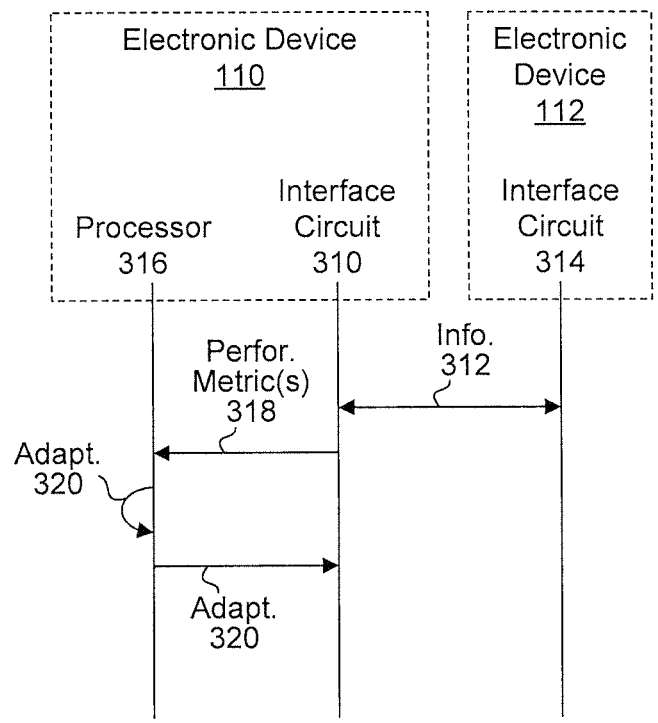
FIG. 3 illustrates an example communication between electronic devices, according some embodiments.

FIG. 3 illustrates an example communication between electronic devices, according to some embodiments. The communication can be, for example, between electronic devices 110 and 112. In particular, an interface circuit 310 in electronic device 110 can communicate information 312 with interface circuit 314 in electronic device 112 via a link. A processor 316 in electronic device 110 can receive one or more performance metrics 318 characterizing the communication and/or the link. Based on one or more performance metrics 318, a program module executed by processor 316 can adapt the communication of information 312 and/or interface circuit 310. An adaptation 320 can be provided to interface circuit 310 so that a subsequent communication is appropriately modified or adjusted, according to some embodiments.

In some embodiments, adaptations 320 can include (i) configuring a queue (e.g., an interface output or send queue), (ii) avoiding retransmission of a packet when the link is unavailable, (iii) avoiding retransmission of the packet based on a latency of the link, and/or (iv) setting a TCP send window size based on a maximum bandwidth of the link. Additionally, in some embodiments, adaptations 320 can be based on one or more historical performance metrics characterizing the link that are aggregated and stored in memory. The memory can be local or remote (e.g., in a network-accessible server) to electronic device 110.

As would be understood by a person of ordinary skill in the art, the adaptations in the communication of information can, among other things, provide improved situational awareness to the program module (or an application) executing on an electronic device. In turn, the program module can make informed decisions on ways to improve performance and thus overall user experience.

In some embodiments, in referring to FIG. 3, interface circuits 310 and 314 in electronic devices 110 and 112, respectively, can use knowledge of the status of an underlying link to report anomalies observed on the link to a kernel networking stack. Network drivers in a data-link layer can provide the status information to higher layers (e.g., a layer between layer 3 and layer 6 in the OSI model). This allows the higher layers—e.g., the transport layer—and applications to make better decisions in the communication of information. These decisions include, for example, decisions to address the anomalies, such as decisions relating to connections or host-level transitions.

For example, if there is a misalignment between TCP protocol timers and radio-interface timers used for switching between different radio modes, an incidence of packet loss and latency on the interface can increase. With the coexistence requirements (e.g., in Bluetooth or Wi-Fi) on interfaces and mixed use of Wi-Fi for peer-to-peer communication and an infrastructure mode, the potential for misalignment between the interface and the TCP windows can be significant. In some embodiments, this misalignment can be addressed by using link-state notifications when adapting the communication of information. The network stack of the OSI model can track the availability status of an interface, which can be used to control TCP behavior. For example, the TCP can be prevented from attempting to transmit information during a period of unavailability (e.g., when the Wi-Fi interface switches from an infrastructure mode to peer-to-peer communication or when the interface switches to a sleep or power-saving mode) or from considering a period of unavailability to indicate packet loss.

The adaptation of the communication of information based on link performance can be applied to a variety of scenarios. For example, when a Wi-Fi interface performs channel switching between infrastructure mode and peer-to-peer mode to scan for peers, a large variance in a round-trip time can exist. In particular, a data path can be blocked for up to 200 ms. This status information can be used by the higher layers to avoid a large deviation in the TCP retransmit timeout for connections that occur via the Wi-Fi interface, according to some embodiments.

In another example, when an interface switches from a low-power mode to a high-power mode (or vice-versa), the network stack and application can leverage this information. In particular, this information can trigger discretionary background traffic to align itself with power transitions and to avoid an unnecessary wake-up of the electronic device, according to some embodiments. Discretionary background traffic can refer to background traffic that can be delayed until a next opportunistic time.

Also, by performing statistical analysis of link-level performance metrics, the application can make an intelligent decision about a long-term connectivity available to the electronic device over a particular network interface. The electronic device can thus decide whether to use the particular network interface for discretionary traffic.

In another example, with respect to packet reordering on wireless networks, the TCP layer can avoid optimizations to improve performance/latency on lossy (wireless) networks when packet reordering is detected. In particular, to avoid unnecessary retransmissions, the TCP layer avoids optimizations such as early retransmit (e.g., as described in RFC 5827) when packet reordering is detected. If reordering on a first hop and no congestion are indicated, this information can help the network stack to enable optimizations—e.g., early retransmits—to improve link performance, according to some embodiments.

Similarly, if there is an indication that an occasional packet loss is caused by a channel error rather than congestion, then the transport layer of the OSI model can take this information into account when adjusting a transmit rate.

Moreover, if there are too many link-level retransmissions, the transport layer may not see a packet loss, but an increase in overall latency can result. To reduce the latency, the transport layer can consider a higher level of link-layer retransmission as an indicator of congestion.

In some embodiments, the adaptation to the communication of information based on link performance can allow the application to interpret events. In particular, wireless networks (e.g., Wi-Fi, cellular, and Bluetooth) have similar characteristics and are susceptible to higher packet loss or latency than wired networks. Wireless networks have link-layer retransmission to compensate for the higher packet loss or latency. These networks also have network interface unavailable exceptions due to a power save mode or the need to access different wireless channels.

In some embodiments, the wireless network characteristics can be abstracted into measurable performance metrics such as, for example, any or all of (i) a maximum/effective bandwidth, (ii) a minimum/effective/maximum latency, (iii) jitter, (iv) a level of link-layer retransmissions, and (v) a minimum/average/maximum queue sizes. Reports can be generated for each wireless connection, for a peer, or for a network-service class. In some embodiments, a link-status report can be generated at a frequency of 3-5 seconds when there is active data transfer on a network interface. The lifespan of a single report can be limited to the report interval in a kernel networking stack, according to some embodiments. Consequently, a new status report can replace an existing report in the kernel networking stack.

A link-notification system (e.g., an operating system) can also keep track of historical usage or link characteristics so that the electronic device can learn network-connectivity characteristics, according to some embodiments. For example, the historical usage can provide hints to an application as to whether a particular link or wireless network is suitable for the application. In the link-notification system, overhead can be managed so the notifications do not result in significant processor, memory, or power overhead, but at the same time, the event mechanism can be timely, relevant, and useful.

The notifications can be received in a kernel network stack and be propagated to potential customers (e.g., applications) that can use this information, according to some embodiments. In particular, a framework with different application programming interfaces (APIs) can (i) collect hints/events from network drivers, (ii) save the hints/events for their lifetime, (iii) notify subsystems that need to know about the hints/events, and (iv) provide a way to query for the hints/events.

Figure 4:
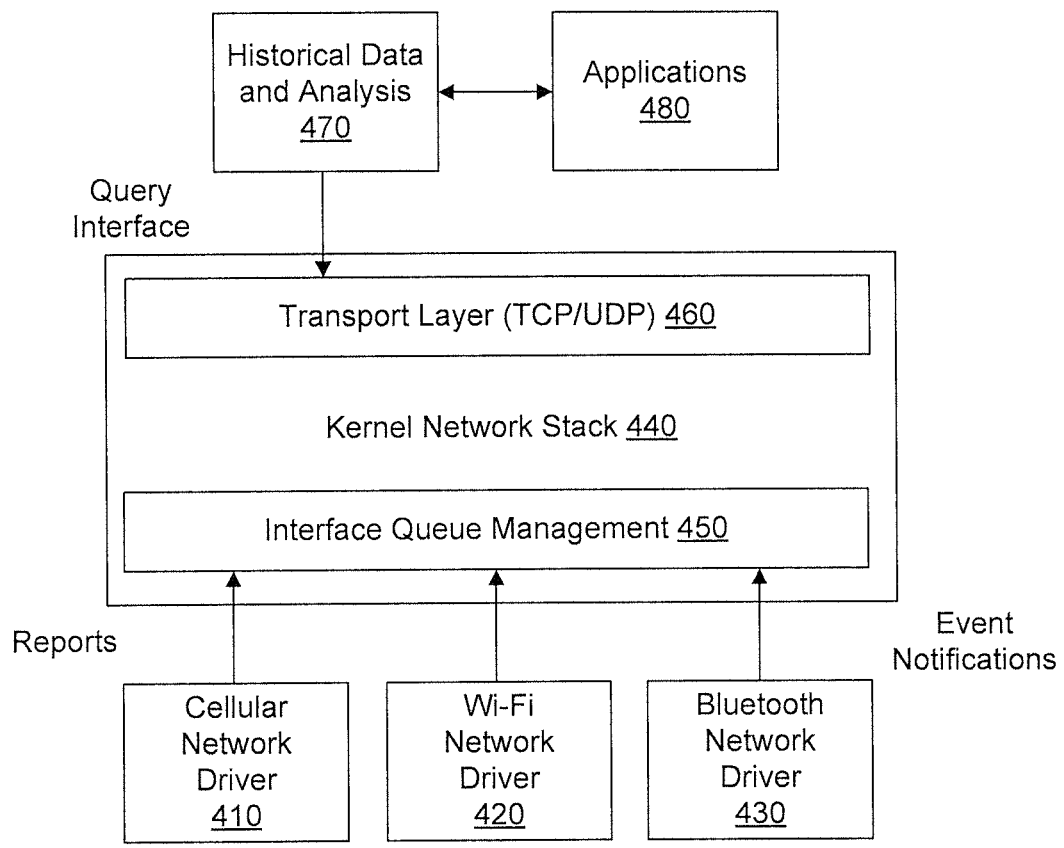
FIG. 4 illustrates an example notification system, according to some embodiments.

FIG. 4 illustrates an example notification system, according to some embodiments. In some embodiments, components of the notification system can propagate or use link-state notifications (e.g., event notifications or status reports) from a cellular network driver 410, a Wi-Fi network driver 420, and/or a Bluetooth network driver 430. The link-state notifications can be received by an interface queue management module 450 in a kernel network stack 440 (which may be implemented as a program module or an engine). Kernel network stack 440 can share the link-state notifications with a transport layer 460 (e.g., TCP/User Datagram Protocol (UDP)). Historical data and analysis 470 about network performance can be accessed via a query interface and/or shared with applications. In addition, applications 480 can access the link-state notifications via transport layer 460. In some embodiments, kernel network stack 440 includes an interpreter engine (not shown in FIG. 4) to interpret information from network drivers 410, 420, and 430 (e.g., by setting flags based on a comparison of the information from the network drivers to thresholds) and to provide link-state notifications so that applications can operate in a network state aware manner.

Link-state notifications can be used in different applications. In one application, the link-state notifications can be used to handle transient network interface failures. In wireless networks, a radio can switch to an off mode to save power (and to reduce power consumption). The radio can also switch between different channels to allow for peer-to-peer communication or to access multiple wireless networks. The TCP has fixed timers that may not align correctly with the timing of these switching (or unavailability) events. Consequently, this misalignment can cause TCP connections to back off significantly because there is no continuous flow of TCP acknowledgements. The misalignment can also introduce unnecessary latency in network transfers.

To address this misalignment, a kernel network stack (e.g., kernel network stack 440 of FIG. 4) can use link-state notifications from a network driver (e.g., network driver 410, 420, or 430 from FIG. 4) to adjust the TCP timers so that transient network failures are not treated as congestion on the network, according to some embodiments. For example, the timers can be adjusted between 100 ms and 1 s so that multiple retransmissions do not occur when a link is unavailable. Alignment of the timers can also be used to prevent unnecessary data transmissions across multiple network layers—e.g., if a layer 4 (e.g., TCP) sends a packet when layer 2 (e.g., Bluetooth) is unavailable, the data is not sent even though the underlying link is available to transmit the data.

In another application, link-state notifications can be used to configure a minimum queue delay based on latency measurements. Because wireless networks can have varying network capacities depending on conditions on an underlying link, packets from a kernel networking stack can be buffered in queues before transmitted over the link. One performance metric that can be used to correctly configure the queues is the amount of time the packets spend in the queues (e.g., queuing delay). This queuing delay is directly related to the effective latency on the underlying link. To address this delay, link-state notifications from a network driver—e.g., notifications that include queuing delay information—can be used to accurately and dynamically configure the queues. For example, the link-state notifications can include latency information corresponding to 10% of a round-trip time of 250-300 ms.

In another application, link-state notifications can be a maximum throughput as an input to TCP congestion control. TCP can measure available bandwidth on a link by continuously probing the link. For this measurement, during a slow-start phase, TCP doubles a sending rate in round-trip times until a maximum supported bandwidth is reached. This communication adaptation technique can comply with the standard recommended for TCP congestion control (e.g., as described in RFC 5681).

During the slow-start phase, when the TCP connection doubles its send rate, the TCP can overshoot the capacity of the link and cause a large amount of packet loss. This overshoot can adversely affect network performance in networks such as, for example, LTE that has a large bandwidth-delay product.

As would be understood by a person of ordinary skill in the art, in wireless networks, the first hop can be a bottleneck in the network path. As a result, the throughput of a connection usually cannot exceed the maximum bandwidth available on the first hop. In some embodiments, using link-state notifications from the network driver, the kernel network stack can learn about the maximum throughput available on the link. This information can be used as an input to the TCP congestion control so that the connection can conservatively adjust its sending rate to avoid overshoot and to minimize packet loss, according to some embodiments.

In another application, link-state notifications can be implemented to avoid an excessive number of link layer retransmissions as an indication of congestion. In particular, wireless networks have a mechanism to retransmit each packet a fixed number of times until an acknowledgement is received from a peer. This retransmission can be done to compensate for an unreliability of the underlying wireless link. When a single packet is retransmitted multiple times, the transmission time per packet increases. This increase can result in a corresponding increase in the overall latency of the transfer.

Link layer retransmissions can also avoid packet loss on a busy channel that is oversubscribed. This can prevent the transport-level congestion control (in TCP) from adjusting its sending rate if the congestion control uses packet loss as an indication to backoff.

Further, using link-state notifications, a kernel networking stack can identify scenarios with a high level of link layer retransmissions (e.g., 8-12 link layer retransmissions). The kernel networking stack can use this information as an indication to adjust its sending rate. When the number of retransmissions per packet is low, the overall utilization of the wireless channel can improve significantly. The lower number of retransmissions can also reduce a transmit time (or latency) per packet and can improve the response time of latency-sensitive applications such as, for example, Voice over Internet Protocol.

In some embodiments, an API can be used by network drivers to notify the kernel network stack about link-state notifications and status reports. This API can be a kernel protocol interface (KPI) to let a network driver provide link-specific status information to the kernel network stack. The KPI can copy content from a buffer based on a version and length provided by the network driver. The buffer content can be read but not be modified.

Moreover, in some embodiments, a cellular interface can provide any or all of the following in a status report: (i) a measured uplink bandwidth based on current activity; (ii) a maximum supported uplink bandwidth; (iii) a minimum expected latency for a first hop; (iv) an expected uplink latency for the first hop; (v) a maximum uplink latency for the first hop; (vi) an uplink retransmission level (e.g., low, medium, or high); (vii) a percentage of total bytes lost on an uplink; (viii) a minimum number of bytes a the network interface queue; (ix) an average number of bytes in the network interface queue; (x) a maximum number of bytes in the network interface queue; (xi) a measured downlink bandwidth based on current activity; and/or (xii) a maximum supported downlink bandwidth.

Further, in some embodiments, a Wi-Fi interface can provide any or all of the following in a status report: (i) a link-quality metric; (ii) a measured uplink bandwidth based on current activity; (iii) a maximum supported uplink bandwidth; (iv) a minimum expected latency for a first hop; (v) an expected latency for the first hop; (vi) a maximum expected latency for the first hop; (vii) a current level of link-layer retransmissions (e.g., low, medium, or high); (viii) a percentage of bytes dropped after multiple retransmissions; (ix) a measured downlink bandwidth based on current activity; (x) a maximum supported downlink bandwidth; (xi) a configuration frequency (e.g., 2.4 or 5 GHz); (xii) a number of scans during a previous report period; and/or (xiii) a scan duration.

Figure 5:
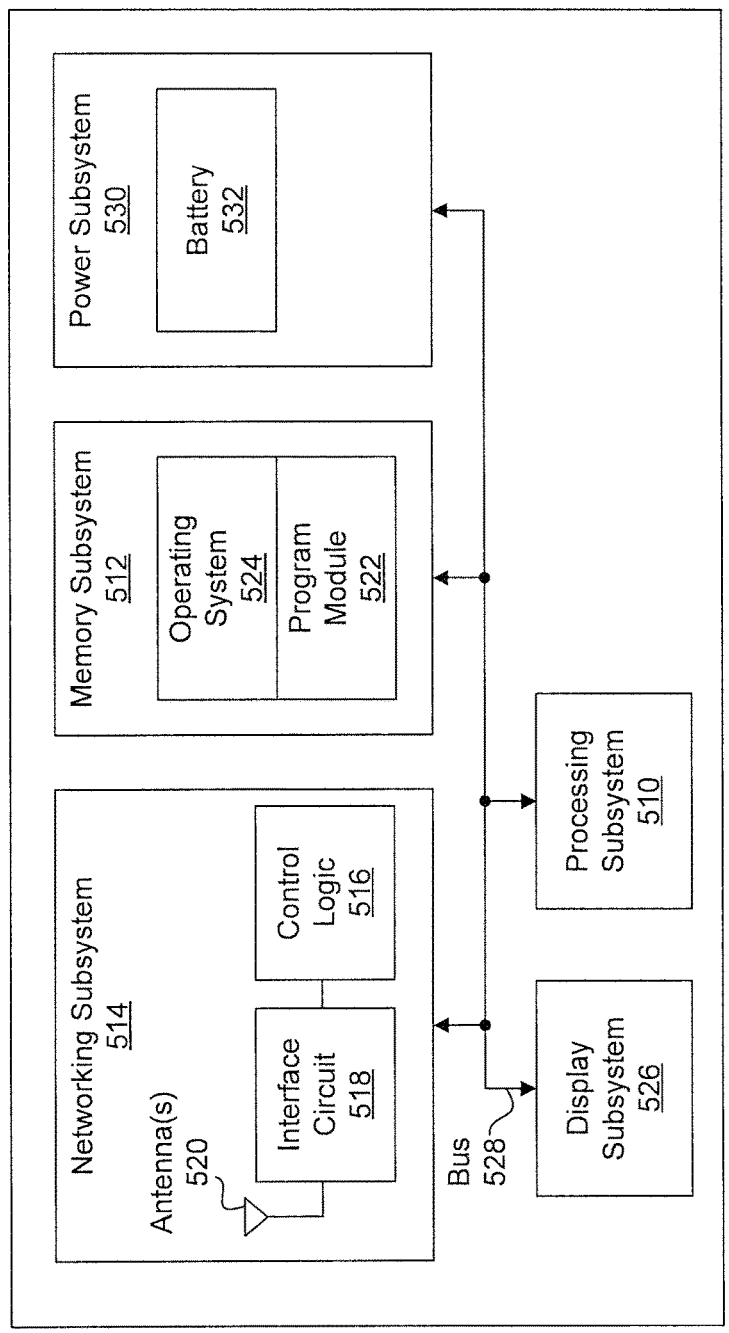
FIG. 5 illustrates an example electronic device, according to some embodiments.

FIG. 5 illustrates an example electronic device 500, according to some embodiments. Electronic device 500 can be, for example, electronic device 110 and/or electronic device 112 in FIG. 1. Electronic device 500 includes a processing subsystem 510, a memory subsystem 512, a networking subsystem 514, a display subsystem 526, and a power subsystem 530. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include one or more program modules or sets of instructions (e.g., program module 522 or operating system 524), which may be executed by processing subsystem 510. Moreover, instructions in the modules of memory subsystem 512 can be implemented in a high-level procedural language, an object-oriented programming language, and/or in an assembly or machine language. The programming language can be compiled or interpreted to be executed by processing subsystem 510.

In addition, memory subsystem 512 can include mechanisms for controlling access to the memory. In some embodiments, memory subsystem 512 includes a memory hierarchy that includes one or more caches coupled to a memory in electronic device 500. In some embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass storage device. In some embodiments, memory subsystem 512 can be used by electronic device 500 as fast-access storage for frequently-accessed data, while the mass storage device can be used to store less frequently-accessed data.

Networking subsystem 514 includes one or more devices configured to couple to and communicate on a wired and/or wireless network (e.g., to perform network operations), including a control logic 516, an interface circuit 518, and one or more antennas 520. For example, networking subsystem 514 can include a Bluetooth networking system, a cellular networking system (e.g., a 3G/4G network such as UMTS or LTE), a universal serial bus (USB) networking system, a networking system based on standards described in IEEE 402.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each networking system. In this disclosure, mechanisms for coupling to, communicating on, and handling data and events on the network for each network system are sometimes collectively referred to as a "network interface" for the network system. In some embodiments, "a network" between electronic devices does not yet exist, and electronic device 500 can use mechanisms in networking subsystem 514 for performing wireless communication between the electronic devices (e.g., transmitting advertising or beacon frames and/or scanning for advertising frames transmitted by other electronic devices).

Power subsystem 530 can include one or more components for providing power to electronic device 500 such as, for example, a battery 532 (and, more generally, an energy-storage component). Power subsystem 530 can also include circuits for charging and, more generally, managing energy storage in battery 532.

In some embodiments, electronic device 500 includes display subsystem 526 for displaying information on a display, which can include a display driver and the display (e.g., a liquid-crystal display or a multi-touch touchscreen).

In referring to FIG. 5, a bus 528 couples processing subsystem 510, memory subsystem 512, networking subsystem 514, display subsystem 526, and power subsystem 530 to one another. Bus 528 can include an electrical, optical, and/or electro-optical connection used by the subsystems to communicate commands and data between one another. Although only one bus 528 is shown for clarity, different embodiments can include a different number or configuration of electrical, optical, and/or electro-optical connections between the subsystems.

Electronic device 500 can be (or can be included in) an electronic device with at least one network interface. For example, electronic device 500 can be (or can be included in) a desktop computer, a laptop computer, a server, a media player (e.g., an MP3 player), an appliance, a subnotebook/netbook, a tablet computer, a smartphone, a cellular telephone, a smart watch, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device, and/or another electronic device.

Although specific components are used to describe electronic device 500, in some embodiments, different components and/or subsystems can be present in electronic device 500. For example, electronic device 500 can include one or more additional processing subsystems, memory subsystems, networking subsystems, power subsystems, user-interface devices, and/or display subsystems. Additionally, one or more of the subsystems may not be present in electronic device 500. Moreover, in some embodiments, electronic device 500 can include one or more additional subsystems that are not shown in FIG. 5. For example, electronic device 500 can include, but is not limited to, a data collection subsystem, an audio and/or video subsystem, an alarm subsystem, a media processing subsystem, and/or an input/output (I/O) subsystem. Also, although separate subsystems are shown in FIG. 5, some or all of a given subsystem or component can be integrated into one or more of the other subsystems or components in electronic device 500, according to some embodiments. For example, in some embodiments, program module 522 can be included in operating system 524.

Moreover, the circuits and components in electronic device 500 can be implemented using any combination of analog and/or digital circuitry, including bipolar, p-channel metal-oxide-semiconductor (PMOS) transistors, and/or n-channel metal-oxide-semiconductor (NMOS) transistors. Further, in some embodiment, signals in electronic device can include digital signals that have approximately discrete values and/or analog signals that have continuous values. Additionally, components and circuits can be single-ended or differential, and power supplies can be unipolar or bipolar.

An integrated circuit can implement some or all of the functionality of networking subsystem 514 such as, for example, a radio. Radios are known to persons of ordinary skill in the art. Moreover, the integrated circuit can include hardware and/or software mechanisms to transmit wireless signals from electronic device 500 and to receive signals (from other electronic devices) at electronic device 500. Networking subsystem 514 and/or the integrated circuit can include any number of radios.

In some embodiments, networking subsystem 514 and/or the integrated circuit can include a configuration mechanism (e.g., one or more hardware and/or software mechanisms) to configure the radio(s) to transmit and/or receive on a given communication channel (e.g., a given carrier frequency). For example, in some embodiments, the configuration mechanism can be used to switch the radio(s) from monitoring and/or transmitting on a given communication channel to monitoring and/or transmitting on a different communication channel. The term "monitoring" as used herein includes receiving signals from other electronic devices and possibly performing one or more processing operations on the received signals (e.g., determining if the received signal includes an advertising frame).

While some of the operations in the above embodiments can be implemented in hardware or software, as would be understood by a person of ordinary skill in the art based on this disclosure, the operations in the above embodiments can be implemented in a wide variety of configurations and architectures. Therefore, some or all of the operations in the above embodiments can be performed in hardware, in software, or both. For example, some of the operations in the above embodiments can be implemented using program module 522, operating system 524 (e.g., a driver for interface circuit 518), or in firmware in interface circuit 518. Alternatively or additionally, at least some of the operations in the above communication embodiments can be implemented in a physical layer of interface circuit 518.

Figure 6:
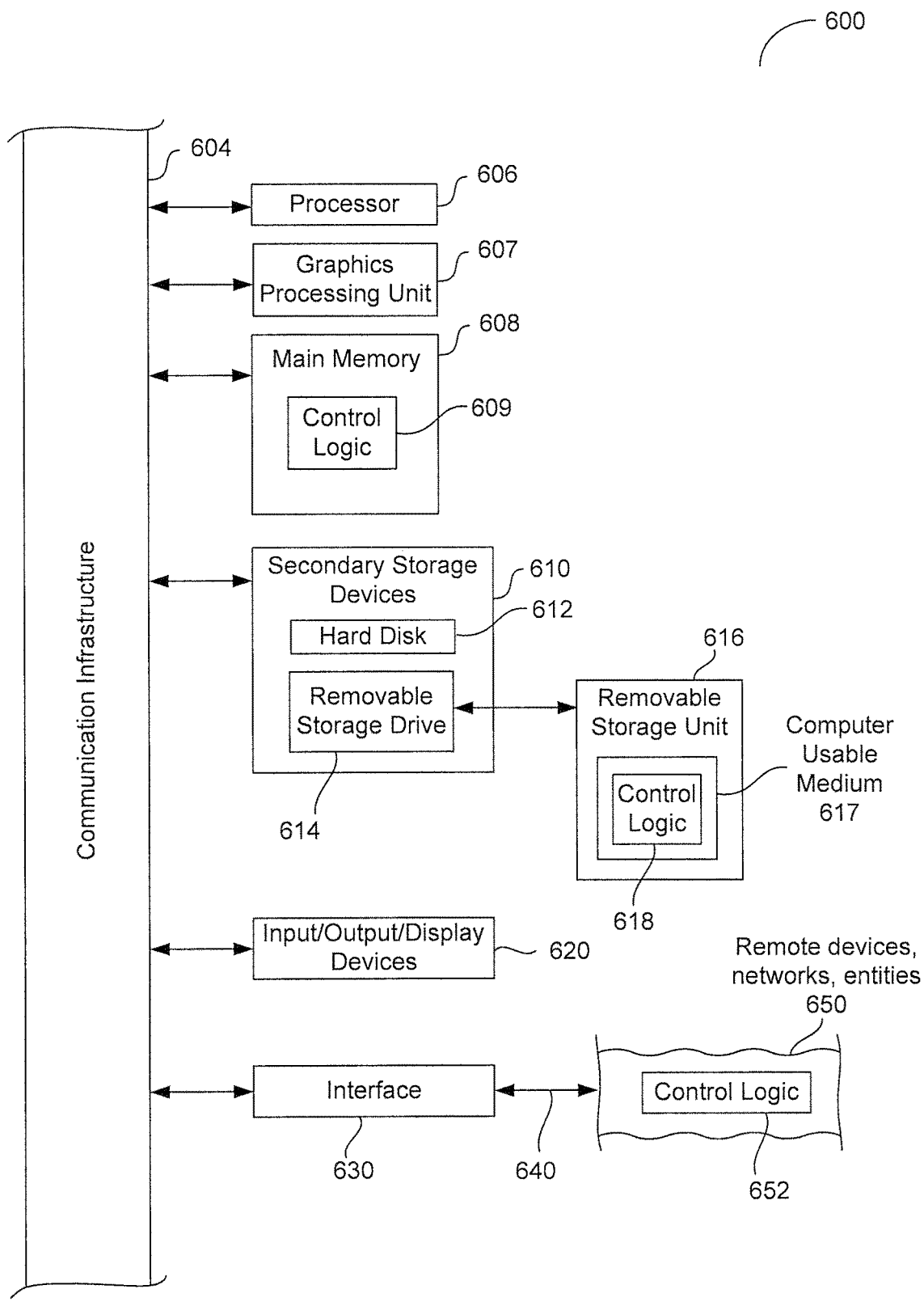
FIG. 6 illustrates an example computer system, according to some embodiments.

Various embodiments can be implemented, for example, using one or more computer systems, such as computer system 600 shown in FIG. 6. For instance, each of the components described in FIG. 5 could be implemented using a computer system such as computer system 600. Computer system 600 can be any computer capable of performing the functions described herein such as, for example, the operations depicted in FIG. 2: (i) the communication of information in 210; (ii) the receipt of one or more performance metrics in 212; and (iii) the adaptation of the communication of the information in 214.

Computer system 600 includes one or more processors (also called central processing units (CPUs)) such as, for example, a processor 606 and a graphics processing unit (GPU) 607. Processor 606 and GPU 607 are connected to a communication infrastructure 604. In some embodiments, communication infrastructure 604 can be a wired network, a wireless network (e.g., compliant with Bluetooth, Wi-Fi, or a cellular communication protocol), or a combination of both.

In some embodiments, GPU 607 is a specialized electronic circuit designed to process mathematically intensive applications. GPU 607 can have a parallel structure that is efficient for parallel processing of large blocks of data such as, for example, mathematically intensive data common to computer graphics applications, images, and videos.

Computer system 600 also includes user input/output/display devices 620—such as, for example, monitors, keyboards, and pointing devices—that communicate with the various components of computer system 600 via communication infrastructure 604.

Computer system 600 also includes a main or primary memory 608 such as, for example, random access memory (RAM). Main memory 608 can include one or more levels of cache. Main memory 608 can also include control logic 609 (e.g., computer software) and/or data.

Computer system 600 can also include one or more secondary storage devices or memory 610. Secondary memory 610 can include, for example, a hard disk drive 612 and/or a removable storage drive 614. Removable storage drive 614 can be a floppy disk drive, a magnetic tape drive, a compact disk drive, an optical storage device, a tape backup device, and/or any other storage device/drive.

Removable storage drive 614 can interact with a removable storage unit 616. Removable storage unit 616 can include a computer usable or readable medium 617 having stored thereon computer software 618 (e.g., control logic) and/or data. Removable storage unit 616 can be a floppy disk, a magnetic tape, a compact disk, a DVD, an optical storage disk, and/any other computer data storage device. Removable storage drive 614 reads from and/or writes to removable storage unit 616.

In some embodiments, secondary memory 610 can include other means, instrumentalities, or other approaches for allowing computer programs and/or other instructions and/or data to be accessed by computer system 600. Such means, instrumentalities, or other approaches can include, for example, a removable storage unit 616 and an interface (not shown). Examples of removable storage unit 616 and the interface can include a program cartridge and cartridge interface (e.g., an interface associated with video game devices), a removable memory chip (e.g., EPROM or PROM) and associated socket, a memory stick and USB port, a memory card and associated memory card slot, and/or any other removable storage unit and associated interface.

Computer system 600 can further include a communication or a network interface 630. Network interface 630 enables computer system 600 to communicate and interact with remote devices, remote networks, and/or remote entities 650 over a communications path 640. Communications path 1026 can be wired and/or wireless and can include any combination of local area networks (LANs), wide area networks (WANs), and the Internet. Control logic 652 and/or data can be transmitted to and received from computer system 600 via communications path 640.

In some embodiments, a tangible apparatus or article of manufacture including a tangible computer usable or readable medium having control logic (software) stored thereon is also referred to herein as a "computer program product" or "program storage device." This includes, but is not limited to, computer system 600, main memory 608, secondary memory 610, and removable storage units 614 and 618, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An apparatus comprising:
 a processor configured to operate at a kernel network stack that is above a data-link layer in an Open Systems Interconnection model;
 an interface circuit coupled to the processor, configured to:
  operate at the data-link layer and communicate with an electronic device via a wireless link; and
  utilize a kernel protocol interface (KPI) to provide one or more performance metrics that characterize the wireless link via a buffer to the kernel network stack;
 wherein the processor is further configured to adapt a communication with the electronic device via the wireless link based at least in part on the one or more performance metrics.

2. The apparatus of claim 1, wherein the one or more performance metrics comprise: a latency of the wireless link, a throughput of the wireless link, a jitter of the wireless link, a packet loss associated with the wireless link, a bandwidth of the wireless link, or an indication of when the wireless link is unavailable.

3. The apparatus of claim 1, wherein the one or more performance metrics includes latency information, and wherein the processor is configured to configure an output or send queue associated with the interface circuit based on the latency information.

4. The apparatus of claim 1, wherein to adapt the communication with the electronic device, the processor is configured to avoid retransmitting a packet in response to the wireless link being unavailable.

5. The apparatus of claim 1, wherein to adapt the communication with the electronic device, the processor is configured to avoid retransmitting a packet based at least in part on a latency of the wireless link.

6. The apparatus of claim 1, wherein to adapt the communication with the electronic device, the processor is configured to set a Transmission Control Protocol (TCP) send window size based at least in part on a maximum bandwidth of the wireless link.

7. The apparatus of claim 1, wherein to adapt the communication with the electronic device, the processor is configured to adapt the communication based at least in part on one or more historical performance metrics characterizing the wireless link.

8. The apparatus of claim 1, wherein the interface circuit is configured to receive the one or more performance metrics from a network driver.

9. The apparatus of claim 8, wherein the network driver is in a data-link layer of an Open Systems Interconnection model.

10. The apparatus of claim 1, wherein the wireless link is associated with a communication protocol based at least in part on Wi-Fi, Bluetooth, or a cellular-telephone communication protocol.

11. The apparatus of claim 1, wherein to adapt the communication with the electronic device, the processor is configured to track one or more historical performance metrics.

12. The apparatus of claim 1, wherein to adapt the communication with the electronic device, the processor is configured to execute a network stack that adjusts one or more Transmission Control Protocol (TCP) timers based at least in part on the one or more performance metrics.

13. The apparatus of claim 1, wherein to adapt the communication with the electronic device, the processor is configured to control a number of link layer retransmissions based at least in part on the one or more performance metrics.

14. A method, comprising:
communicating with an electronic device via a wireless link;
operating at a kernel network stack above a data-link layer;
receiving, using a kernel protocol interface (KPI), one or more performance metrics that characterize the wireless link;
analyzing the one or more performance metrics; and
adapting, at a higher protocol layer than the data link layer, a communication with the electronic device.

15. The method of claim 14, wherein the one or more performance metrics comprise: a latency of the wireless link, a throughput of the wireless link, a jitter of the wireless link, a packet loss associated with the wireless link, a bandwidth of the wireless link, or an indication of when the wireless link is unavailable.

16. The method of claim 14, wherein the adapting the communication with the electronic device comprises configuring an output or send queue associated with transmitting a packet via the wireless link.

17. The method of claim 14, wherein the adapting the communication with the electronic device, comprises avoiding retransmitting a packet in response to the wireless link being unavailable.

18. The method of claim 14, wherein the adapting the communication with the electronic device, comprises avoiding retransmitting a packet based at least in part on a latency of the wireless link.

19. The method of claim 14, wherein the adapting the communication with the electronic device, comprises setting a Transmission Control Protocol (TCP) send window size based at least in part on a maximum bandwidth of the wireless link.

20. A non-transitory computer-readable medium storing instructions that, when executed by a processor of an electronic device, cause the processor to perform operations, the operations comprising:
causing communication with a second electronic device via a wireless link;
operating at a kernel network stack above a data-link layer;
receiving one or more performance metrics that characterize the wireless link, wherein the receiving utilizes a kernel protocol interface (KPI);
analyzing the one or more performance metrics; and
adjusting, by an application at a protocol layer higher than the kernel network stack, the communication with the second electronic device based at least on the analyzing.

* * * * *